April 7, 1931.   J. G. MARISH   1,799,917
HOIST ATTACHMENT FOR AUTOMOBILE TRUCKS
Filed April 7, 1930   2 Sheets-Sheet 1
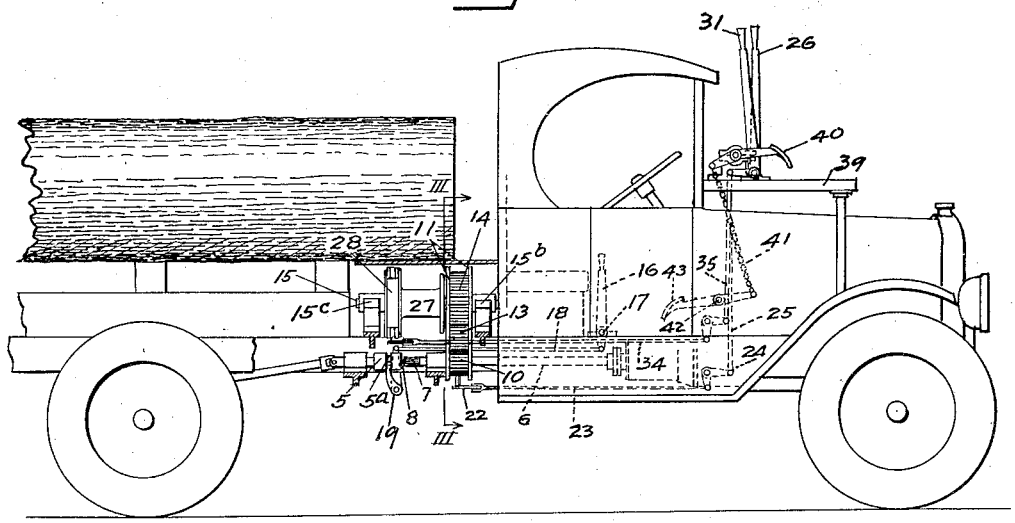
Inventor.
JOSEPH G. MARISH.
By
Attorney.

April 7, 1931. J. G. MARISH 1,799,917
HOIST ATTACHMENT FOR AUTOMOBILE TRUCKS
Filed April 7, 1930 2 Sheets-Sheet 2
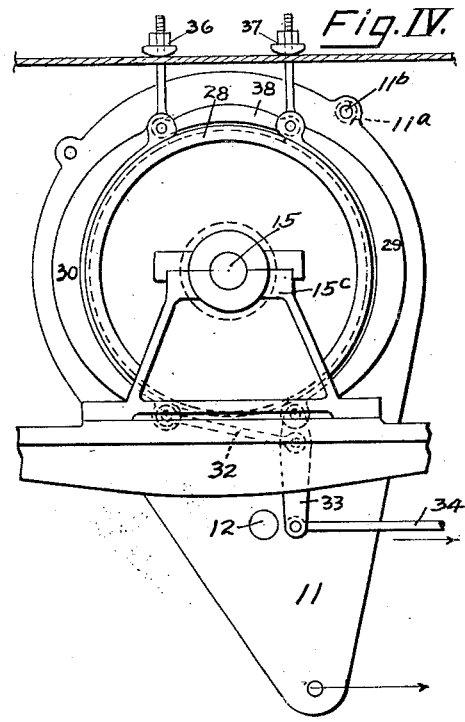
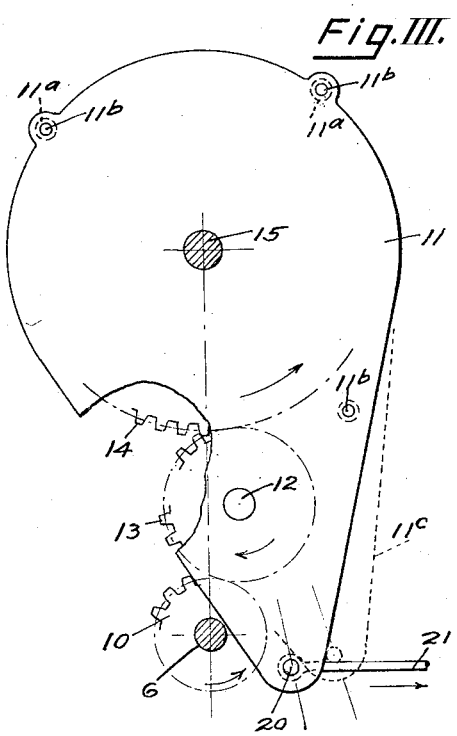
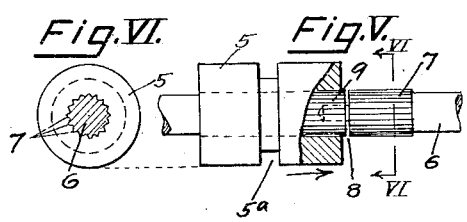
Inventor.
JOSEPH G. MARISH.
By
Attorney.

Patented Apr. 7, 1931

1,799,917

UNITED STATES PATENT OFFICE

JOSEPH G. MARISH, OF PORTLAND, OREGON

HOIST ATTACHMENT FOR AUTOMOBILE TRUCKS

Application filed April 7, 1930. Serial No. 442,326.

My new hoisting attachment is of that class of equipment which is mounted upon the frame of the truck, takes operating power from the truck engine for loading and unloading material and other useful employment which a hoist of that character is ordinarily adapted to. The purposes of my invention are these; to provide a hoisting attachment of exceptionally rugged character with connections that will enable it to utilize the full power of the truck motor; that will enable the full use of the built-in clutch always found on an automobile truck; allow also the full utilization of the speed change gear box commonly built as a part of a truck; and to provide simple and positive means for engaging and disengaging the hoisting attachment with the truck transmission mechanism; and to provide a simple and efficient means for disconnecting and reconnecting the rear axle mechanism of the truck to admit use of the hoisting attachment.

Another important object of my invention is to provide a hoisting attachment that can be attached to practically any truck without requiring that a special gear box or transmission case having a power take-off be obtained from the factory where the truck is manufactured and requiring only such mechanical work for attachment as may be accomplished in the ordinary machine shop and doing away with the necessity of purchasing an entire transmission case and contents as is ordinarily necessary when mounting a hoist on a truck not provided with a power take-off.

The following drawings accompany and are made a part of these specifications and references are placed thereon to identify the several parts shown with the text in these specifications. In the drawings, Fig. I is a conventional or diagrammatic view of a truck showing a preferred method of applying my new hoist attachment; Fig. II is a partial top view of Fig. I with some parts omitted; Fig. III is an end view showing the arrangement for throwing the hoisting drum in and out of operative connection with driving parts of the automobile truck; Fig. IV is a view from the opposite end that Fig. III is taken from; Fig. V is a view of the type of clutch preferred for disconnecting and reconnecting the rear axle as before mentioned; and Fig. VI is a cross section at VI—VI, Fig. V. Numeral 5 indicates the clutch shown at Fig. V in its proper place in the truck mechanism and it is shown in the position of having disconnected the power mechanism of the truck from the rear axle. Numeral 6 represents the tail shaft of the truck which is provided with a splined portion at 7, is divided at 8, has another splined portion shown at 9 to the rearward of the division, 8, and mounted upon 9 is the sliding clutch member, 5, provided with internal grooves adapted to slide easily upon the said splined portions, 7 and 9, and to connect them operatively when the splines on 7 and 9 are placed in longitudinal registration with each other and the clutch member, 5, engaged with both at the same time.

A pinion, 10, is mounted upon and solidly attached to the tail shaft, 6. A swinging housing, indicated by the numeral 11, serves the triple purpose of carrying the idler gear bearing, 12, upon which is mounted the idler gear, 13; providing a cover for the hoist gear, 14; and a cover for all of the gears, 10, 13 and 14. The two parts of the swinging housing, 11, are mounted upon the drum shaft, 15, and have a bearing thereon, that is, the shaft rotates within the housing at this point. They are spaced the proper distance apart by spreaders at 11a shown in dotted outline, and by bolts through the holes 11b. The bolts have been omitted from the drawings for clarity; and also the spreaders, which are simply short tubes, have been omitted from the other views for the same reason. The clutch member, 5, is given a longitudinal sliding motion for the purpose specified by means of the lever, 16, mounted upon the fulcrum, 17, connected to the reach rod, 18, which in turn imparts appropriate motion to the finger, 19, which spans the groove, 5a, in the clutch member, 5.

The swinging housing, 11, is operatively connected by the pivot pin, 20, the link, 21, the bellcrank, 22, the reach rod, 23, forward bellcrank, 24, and tension rod, 25, to the lever 26. Forward or rearward motion of the lever, 26, will respectively cause the swinging housing, 11, to occupy the position shown in the dotted outline at 11c or in full outline as shown in the drawing. When in the latter position the idler gear, 13, will be in mesh with the pinion, 10, and the said idler gear, 13, by reason of the fixed distance between shafts 12 and 15 is permanently in mesh with the hoist gear, 14. When the swinging housing, 11, is in the position shown in dotted outline, 11c, the idler gear, 13, is out of mesh with the pinion, 10, and consequently disconnected with its cooperating part from the truck power mechanism. Appropriate ratchet mechanism for the lever, 26, will be supplied but is not shown in the drawings. A drum of preferred character represented by numeral, 27, has a fixed mounting upon the drum shaft, 15, and suitable bearings for the drum shaft are provided at 15b and 15c. A brake drum, 28, which may be conveniently made a part of the drum, 27, carries brake shoes, 29 and 30, which are operatively connected to the brake lever, 31, by the system of links, levers and rods shown at 32, 33, 34 and 35. The brake shoes, 29 and 30, have anchorage points at 36 and 37 and are tied together by the link, 38.

To make use of this mechanism to the fullest advantage, the levers 26 and 31, controlling respectively the swinging housing, 11, and the brake shoe 29 and 30, have been mounted upon a platform, 39, and there also is found the clutch lever, 40, having a suitable support, the details of which have been omitted to avoid crowding in the drawing, connected by a chain, 41, with the clutch shaft, 42, upon which also is mounted the conventional clutch pedal, 43, used in operating the truck upon the road. The use of the chain member, 41, instead of a rigid connection does away with interference from the clutch lever, 40, while the truck is being used upon the road.

When the truck has been brought to a point where it is desired to use the hoist mechanism, the lever, 16, will be manipulated to disengage the motor from the rear axle by backward sliding of the clutch member, 5. The truck transmission will be left in gear at such of its several speed ratios as the operator deems most suitable for the work about to be done and the operator will then take his place upon the platform, 39, where in full view of the hoisting to be done he will manipulate the clutch lever, 40, to disconnect the engine, then subsequently he will cause the swinging housing, 11, to move inwardly engaging the pinion, 10, and the idler gear, 13, which completes an operative connection between the truck motor and the hoisting drum, 27, and he may thereafter by the use of the throttle, the brake, and the clutch, handle the hoisting requirements. He may also take advantage according to the load to be hoisted, of the speed change facilities of the truck gear box, a thing that is impossible with the ordinary power take-off which has only one speed, or rather one speed ratio with a truck motor.

Having thus fully described my invention, so that anyone familiar with the art to which it appertains could make and use the same, what I claim as new, and desire to secure by Letters Patent, is—

1. In a hoisting mechanism for attachment to an automobile truck, a disconnecting clutch on the tailshaft of said truck, a pinion fixed on a portion of said tail shaft connected to the truck gear box, a hoisting drum having bearings and a brake mechanism for said drum, a drum shaft for said drum, a driving gear upon said shaft, a swinging housing encompassing said driving gear, an idler gear mounted in said housing in mesh with said drum gear and operative mechanism connected with said housing adapted to bring said idler gear selectively in or out of mesh with a pinion on the tailshaft of the truck.

2. In a truck power hoist attachment for an automobile truck, hoisting means, having a shaft means for dividing the tailshaft of said truck into a driving and a driven portion, a pinion mounted on the driving portion, and a housing containing gear means for driving the hoisting means and means for pivotally mounting the same on the shaft of the hoisting means whereby the housing may be swung to engage the gear means with said pinion.

3. In an attachable hoisting machine for an automobile truck having a motor, a speed change gear box, a driving shaft from said gear box and an operative platform; a dividing clutch for said driving shaft, a pinion mounted on the driving end of said shaft, a hoisting drum having a drumshaft in longitudinal alignment with said driving end, a driving gear on said drumshaft, a swinging housing pivoted on said drum shaft and carrying an idler gear for meshing with said pinion, operative lever connections to selectively place the said idler in mesh with said pinion, and means for operative control of the truck motor and the drum mechanism on said operator's platform external to the truck body and forward of the load.

4. In a hoisting mechanism to be mounted on an automobile truck, a dividing clutch in the truck tail shaft to disconnect the shaft from the truck wheels, a supplementary pinion fixed to the driving end of said tail shaft, a hoisting drum shaft, a drum having a fixed mounting on the drum shaft, swinging housing means including a drum driving gear train pivoted on said drum shaft, an operator's platform positioned externally of and attached to the truck body forward of the load carrying part, braking mechanism for the drum, and control means mounted on the platform for controlling the brake mechanism and for swinging the housing to engage the gear train with the pinion.

JOSEPH G. MARISH.